United States Patent
Zeck

(10) Patent No.: US 8,475,550 B2
(45) Date of Patent: Jul. 2, 2013

(54) SELF-OPTIMIZING ODORANT INJECTION SYSTEM

(75) Inventor: Mark Zeck, Snyder, TX (US)

(73) Assignee: Sentry Equipment Corp., Oconomowoc, WI (US)

( * ) Notice: Subject to any disclaimer, the term of this patent is extended or adjusted under 35 U.S.C. 154(b) by 0 days.

(21) Appl. No.: 13/418,977

(22) Filed: Mar. 13, 2012

(65) Prior Publication Data

US 2012/0167465 A1      Jul. 5, 2012

Related U.S. Application Data

(62) Division of application No. 12/407,387, filed on Mar. 19, 2009, now Pat. No. 8,349,038.

(60) Provisional application No. 61/039,606, filed on Mar. 26, 2008, provisional application No. 61/039,610, filed on Mar. 26, 2008.

(51) Int. Cl.
*C10J 1/28* (2006.01)
*G05D 11/00* (2006.01)

(52) U.S. Cl.
USPC ............. 48/195; 48/190; 48/127.3; 137/9; 137/98; 137/861.41; 137/605; 137/3; 137/101.19; 137/101.21; 137/606; 137/607; 137/551; 137/861.12; 700/266; 261/DIG. 17; 261/76; 428/905

(58) Field of Classification Search
USPC ............................. 48/195; 422/4; 60/584, 533
See application file for complete search history.

(56) References Cited

U.S. PATENT DOCUMENTS

| | | | |
|---|---|---|---|
| 4,611,294 A * | 9/1986 | Stanfill | 48/195 |
| 7,056,360 B2 | 6/2006 | Zeck | |
| 7,389,786 B2 | 6/2008 | Zeck | |
| 2001/0014840 A1 | 8/2001 | Marshall et al. | |
| 2001/0047621 A1 * | 12/2001 | Arnold | 48/195 |

\* cited by examiner

*Primary Examiner* — Kaity V. Handal
(74) *Attorney, Agent, or Firm* — Jansson Munger McKinley & Shape Ltd.

(57) ABSTRACT

A method for injecting a chemical, such as an odorant, from a chemical supply into a fluid-containing system such as a natural gas or an LPG pipeline. A tank of odorant is maintained at a pressure above ambient, but below pipeline pressure. An injection conduit communicates the odorant tank with the pipeline. A hydraulic pressure booster is located in the injection conduit for pressurizing the chemical to a pressure above that of the pipeline. Flow-control apparatus located within the injection conduit for metering chemical to be injected into the pipeline is either (a) drip-style metering valve adjustable between a drop-wise setting and a steady-flow setting or (b) a pair of valves one of which is a flow valve allowing larger volumes to be injected and the other which is a drop-wise flow valve for metering smaller volumes of the chemical.

11 Claims, 9 Drawing Sheets

SELF-OPTIMIZING ODORANT INJECTION SYSTEM

RELATED APPLICATIONS

The present application claims priority from U.S. patent application Ser. No. 12/407,387, filed Mar. 19, 2009, which claims priority from Provisional Patent Application Ser. No. 61/039,606, filed Mar. 26, 2008, and Provisional Patent Application Ser. No. 61/039,610, filed Mar. 26, 2008.

FIELD OF INVENTION

The present invention relates generally to apparatus and methods for injecting chemicals into pipelines and, more specifically, to apparatus and methods for adding odorant to natural gas or liquefied petroleum gas flowing in a pipeline.

DESCRIPTION OF THE PRIOR ART

There are many instances in which it is desirable to inject chemicals of various types into fluids (gas and liquids) flowing in pipelines. One such example is in the area of natural gas pipelines. In addition to substances such as corrosion inhibitors and alcohol to inhibit freezing, odorants are commonly injected into natural gas pipelines. Natural gas is odorless. Odorant is injected into natural gas in order to provide a warning smell for consumers. Commonly used odorants include tertiary butyl mercaptan (TBM). Such odorants are typically injected in relatively small volumes normally ranging from about 0.5 to 1.0 lbs/mmscf.

The odorants are typically provided in liquid form and are added to the gas at a location where distribution gas is taken from a main gas pipeline and provided to a distribution pipeline. In such circumstances, the gas pressure may be stepped down through a regulator from, for example, 600 psi or more, to a lower pressure in the range of 100 psi or less. The odorants can also be added to the main transmission pipeline in some situations.

As will be apparent from the above discussion, the odorants which are added to natural gas are extremely concentrated. Odorants such as TBM and other blends are mildly corrosive and are also very noxious. If the job of injecting odorant is not performed accurately, lives are sometimes endangered. It would be possible for a homeowner to have a gas leak with a leak not being realized until an explosion had resulted if the proper amount of odorant was not present. Also, if a leak of odorant occurs at an injection site, people in the surrounding area will assume that a gas leak has occurred with areas being evacuated and commerce being interrupted. Contrarily, if such mistakes become common, people in the surrounding area will become desensitized to the smell of a potential gas leak and will fail to report legitimate leaks.

Two techniques are commonly used for providing odorization to natural gas in a main distribution pipeline. The first technique involves the injection of liquid odorant directly into the pipeline through the use of a high pressure injection pump. The odorant is pumped from a liquid storage tank into a small pipe which empties directly into the main gas pipeline. Because odorant is extremely volatile, drops injected to the pipeline immediately disperse and spread throughout the gas in the pipeline. In this way, within a few seconds, the drops of liquid odorant are dispersed in gaseous form. U.S. Pat. No. 6,208,913 (Marshall et al.) and U.S. Pat. No. 5,490,766 (Zeck) both show state-of-the-art fluid pumps for injecting odorant.

There are several disadvantages with this prior art technique. As mentioned above, the odorant liquid is extremely noxious. The injection pump must therefor be designed so that no odorant can leak. This requires a pump design which is relatively expensive and complex in order to meet the required operating conditions. In even such sophisticated systems, there is an unpleasant odor present when working on the pump which can make people think that there is a natural gas leak.

Another technique for odorizing a natural gas pipeline involves bypassing a small amount of natural gas at a slightly higher pressure than the pressure of the main distribution pipeline, through a tank containing liquid odorant. This bypass gas absorbs relatively high concentrations of odorant while it is in the tank. This heavily odorized bypass gas is then placed back into the main pipeline. The odorant, now volatilized, is placed back into the main pipeline and diffuses throughout the pipeline in much the same manner as described with respect to the liquid injection system. U.S. Pat. No. 6,142,162 (Arnold), shows such a method for odorizing natural gas in a pipeline utilizing bypass piping in conjunction with a liquid odorant storage tank.

There are also a number of disadvantages associated with the bypass system for odorizing pipelines. One disadvantage of the bypass system is the fact that the bypass gas picks up large and inconsistent amounts of odorant from the liquid in the tank and becomes completely saturated with odorant gas. As a result it is necessary to carefully monitor the small amounts of bypass gas which are used. Also, natural gas streams typically have contaminates such as compressor oils or condensates which can fall out into the odorant vessel in bypass systems. These contaminates create a layer that reduces the contact area between the liquid and the bypass stream. This necessarily degrades the absorption rate of the stream.

In U.S. Pat. No. 7,056,360 (Zeck) is on an improved system for odorizing natural gas flowing through a pipeline by injecting odorant into the pipeline at a controlled rate. The system includes an odorant storage tank containing an odorant to be injected. A pressurized source of inert gas, such as nitrogen, communicates with the odorant storage tank for maintaining the tank at a desired positive pressure above the pressure of the natural gas pipeline. An injection conduit communicates the odorant storage tank with the pipeline. A photooptic metering means, located within the injection conduit, meters odorant to be injected into the pipeline.

The odorization system described in issued U.S. Pat. No. 7,056,360, was extremely simple as compared to existing positive displacement pump systems. The system offered improved ease of understanding, operation and maintenance. As compared to the prior art systems, the system described therein offered more accurate control, verification (drop counting) and communication (alarms, status, etc) than the prior art systems. The system offered generally smell free operation and maintenance. However, despite these many advantages, the previously described system also required that the odorant storage tank be pressurized to a pressure above the pipeline pressure of the pipeline being odorized.

U.S. Pat. No. 7,389,786 (Zeck), represented a further advance in the art and offered certain advantages over the previously described optic system in some situations in that an ultrasonic measuring unit allows the odorant to be metered on a drop wise basis with drops of chemical being counted as they pass through the flow vale into the injection conduit and into the natural gas pipeline. The ultrasonic measuring unit also allows steady state flow conditions to be measured accurately. Such a sonic measuring unit can advantageously be utilized in a wide range of flow situations. However, the system continued to require that the odorant tank be maintained above the pressure of the gas pipeline being odorized, however.

There continues to be a need for improvements in odorization systems of the above described types.

SUMMARY OF THE INVENTION

The present invention has as its object to provide even further advantages over the previously described systems. The present system provides distinct advantages in situations in which high volume odorization is required. High volume odorizer's have depended on traditional positive displacement pumps or solenoid valves to deliver discrete doses of odorant to natural gas or LPG streams for the purpose of bringing these streams to safe perception levels. These methods can leave dangerous dead time between doses. By-pass style systems fail to accurately measure and control the amount of odorant being added to the stream. This absorption amount can change radially as condensates and other contaminates fall out and change the absorption boundary layer.

The present invention solves many of the previously encountered problems of dead time and/or accuracy in high volume systems of the type under consideration. The method and apparatus of the invention provide the safest method presently available to accurately odorize mid to large gas streams. In addition, as will be apparent from the written description which follows, the system of the present invention also has the added benefit of providing a means for small odorizers, such as the Z9000.™ unit referenced in the following Detailed Description Of The Invention, to odorize small streams without requiring the storage tank to be maintained above pipeline pressure.

The odorizing system of the invention is used for injecting a chemical, such as an odorant, from a chemical supply into a natural gas or liquefied petroleum gas pipeline at a desired injection rate. The system includes a chemical storage tank containing a chemical, such as the odorant to be injected. An injection conduit communicates the chemical storage tank with the pipeline. A hydraulic pressure booster is located in the injection conduit for pressurizing the chemical to a pressure above that of the pipeline. The hydraulic pressure booster has a first side which communicates with the chemical in the injection conduit and a second, isolated side which is exposed to hydraulic pressure but which is isolated from the chemical being injected. A flow-control valve may be located within the injection conduit for metering chemical to be injected into the pipeline. Preferably, the hydraulic pressure booster is a diaphragm pump having an isolated fluid which acts upon the diaphragm, the isolated fluid being a hydraulic fluid.

Unlike certain of the prior art systems, the chemical storage tank in the present system is preferably maintained at a pressure above ambient, but below the pressure of the pipeline. In one form of the invention, the chemical leaving the diaphragm pump passes to a motor driven flow-control valve, the position of the valve being controlled by an electric motor, whereby opening of the valve causes a stream of chemical to be injected into the pipeline at a desired flow rate. In another form of the invention, the chemical leaving the diaphragm pump feeds a drip style metering valve, the valve being adjustable between a drop wise setting for metering chemical into the pipeline on a drop by drop basis and a steady flow setting for metering chemical on a steady state flow basis. In a third form of the invention, the chemical leaving the diaphragm pump feeds both a motor controlled flow valve which allows larger volumes of chemical to be injected into the pipeline, and a drop wise flow valve for metering smaller volumes of chemical being injected.

In yet another aspect of the invention, an electronic controller controls a linear thruster. This option has the ability to deliver small to large volume/stroke by precisely controlling the displacement rod of the linear thruster and measuring the force. This arrangement eliminates the need for a separate metering unit. In addition to monitoring the forces of the linear thruster, an optional pressure transmitter monitors the hydraulic and/or odorant pressures of the system. This information is fed directly to the primary controller to verify and/or augment the data from the linear thruster.

Additional objects, features and advantages will be apparent in the written description which follows.

DETAILED DESCRIPTION OF THE INVENTION

Figure 1:
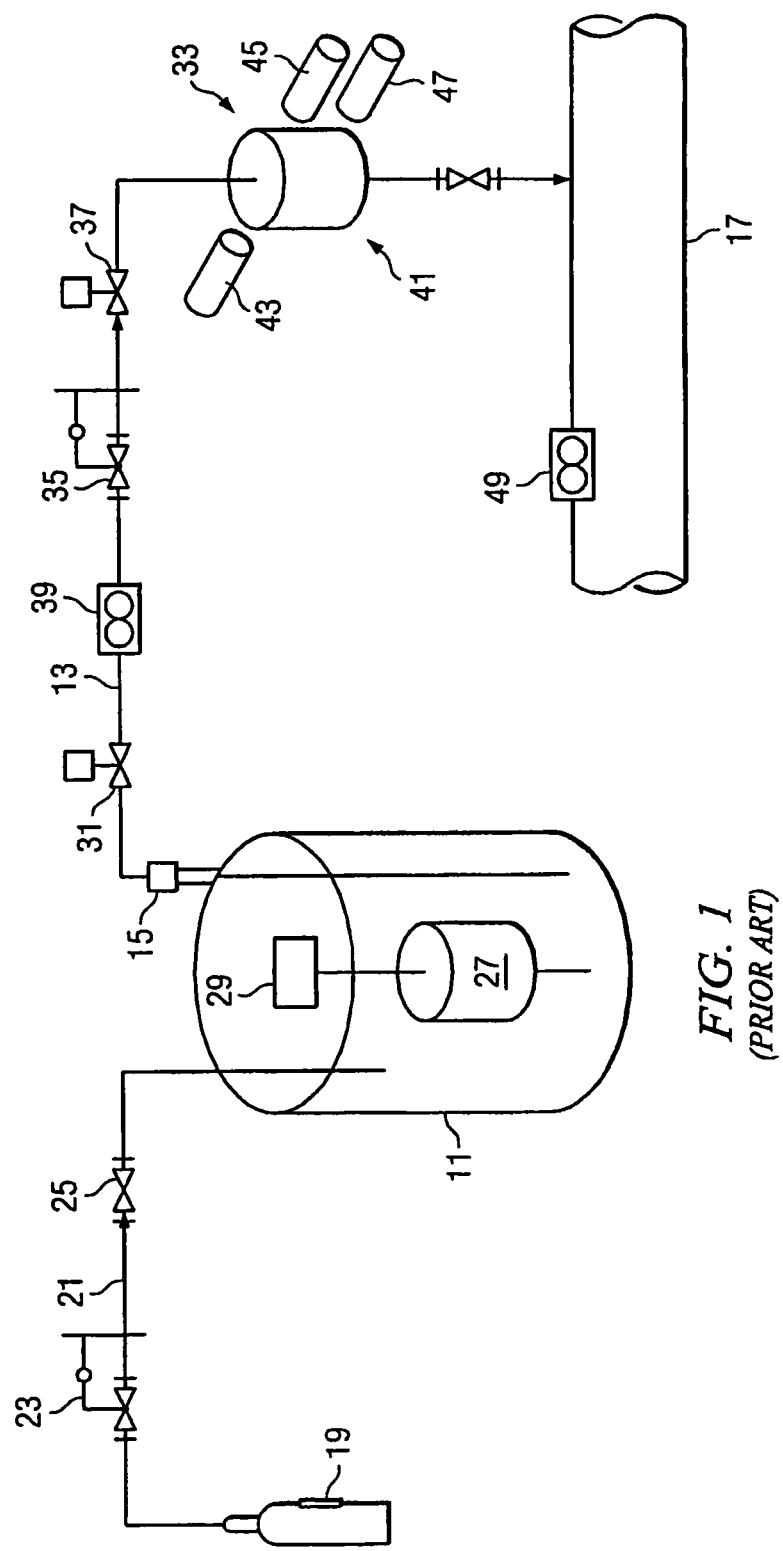
FIG. 1 is a schematic representation of one version of Applicant's prior art optical odorization system as described in U.S. Pat. No. 7,056,360.

The present invention has as its object to provide a system for injecting chemicals into a pipeline, such as for injecting an odorant of the type used for odorizing natural gas, which is simpler in design and more economical in operation than the prior art systems, which is more reliable, and which can be used in both small and large flow applications as well as to inject chemicals into liquefied petroleum gas (LPG) pipelines.

The present invention offers several unique advantages over existing chemical injection and odorization systems in both small and larger flow rate applications. It has particular applicability to odorization systems for natural gas pipelines and LPG pipelines but those skilled in the art will understand that the system can also be used to inject other chemical substances, such as alcohol to inhibit freezing, corrosion inhibitors, and the like.

A number of problems inherent in the prior art systems are overcome with the odorization system of the invention. As mentioned under the "Background" discussion above, low flow rate systems such as those typically found in city distribution systems have typically been difficult to odorize accurately. A low pressure environment does not provide a positive seating action for positive displacement (fluid pump) type odorization systems. Such systems require a pump inlet pressure that is precariously close to the natural gas pipeline pressure, thereby inviting free flow or volume surges in the system. In the low flow rate situation, the amount of odorant per stroke is extremely small. The current systems tend to vapor lock or have such a long time between injections that gas is not evenly odorized. These low flow rate systems also need to be located where the distribution system is located. Thus, they are commonly surrounded by hospitals, schools, metro areas and other residential areas. The currently available injection systems are complex and do not contain fugitive emissions during maintenance. During operation, many of these systems exhaust natural gas into the air with every stroke of the injection pump.

There are also known disadvantages associated with the high flow rate applications. These high flow rate applications are typically found on interstate gas pipelines, for example. One disadvantage is the turn down ratio associated with such systems. On theses systems gas flow rate can range considerably. When a positive displacement pump is sized for lower end capacity, it is required to work too hard at the upper end. This causes wear on the equipment prematurely. Sometimes the upper end demand cannot be met and desired odorization levels cannot be met. As a result, hybrid dual pump configurations have been tried in the past, resulting in expensive and complex system designs. When the pump is sized for the higher end of demand, the time between strokes is excessive. This results in dead spots. As a result, the gas is not evenly odorized.

Another disadvantage of the high flow applications is the fact that the larger pumps suffer a greater failure rate with subsequent leakage. Considerable actuation gas (normally natural gas) is required to actuate the pump. These systems also suffer from winter freeze blockages and exhaust natural gas to the atmosphere.

In order to better understand the operation and advantages offered by the present invention, reference will first be had to FIG. 1 of the drawings which shows Applicant's "Z9000.™" Optical Odorization System, shown in U.S. Pat. No. 7,056, 360. The Z9000.™ unit is commercially available from Zeck Systems, LLC, of Snyder, Tex. This prior art system will be utilized to illustrate the general operating environment of odorization systems of the type under consideration. The system includes a chemical storage tank 11 which contains a chemical to be injected, preferably a suitable odorant for natural gas such as the tertiary butyl mercaptan (TBM). The tank 11 is connected to an injection conduit 13 by means of commercially available quick-disconnect fitting 15.

The odorant contained within the tank 11 must be at a positive pressure which exceeds the pressure of the natural gas pipeline 17 into which the odorant is to be injected. For this reason, a pressurized gas source 19 communicates with the chemicals storage tank 11 by means of conduit 21 and regulator valve 23 for maintaining the tank 11 at a desired positive pressure above the pressure of the natural gas pipeline 17. For example, if the pipeline 17 is maintained in the range of 300 to 400 psi, the storage tank 11 can be maintained in the range of 500 psi by means of nitrogen blanket provided by the nitrogen tank 17. An isolation valve 25 can also be present in the conduit 21. The storage tank 11 will also typically be equipped with a level float 27 and a sensor unit 29.

In the system illustrated in FIG. 1, odorant passes from the storage tank 11 through the odorant isolation valve 31 toward the pipeline 17. A metering means, designated generally as 33 is located within the injection conduit 13 for metering odorant to be injected into the pipeline. In the system shown in FIG. 1, the odorant is metered on a drop wise basis with individual drops of odorant being counted as they pass through the injection conduit 13 into the pipeline 17.

Odorant flows through the injection conduit 13 to the odorant regulator valve 35 which drops the odorant pressure to a desired pressure slightly above the pipeline pressure. The flow-control valve 37 controls the odorant flow rate. If high flow rates are anticipated, a flow meter 39 measures the odorant flow as the drops begin to turn into a stream. The flow-control valve 37 continues to control odorant flow during this period. If the flow rate falls below a preset minimum of control valve 37, a timing mechanism closes and reopens to compensate. Drop size can be verified using the optional level monitor 27 located within the storage tank 11 or by the meter 39. Other empirical data, either current or historical, can also be utilized. A controller calculates drop size based on temperature, pressures, physical constants of the odorant blend and orifice size. The drop size can be verified and adjusted.

In the particular system illustrated in FIG. 1 of the drawings, a flow-control valve 37 is utilized which is capable of metering extremely precise amounts of odorant. The metering means also includes a drop counter, designated generally as 41, which can be any of those selected from among photooptic counters, laser counters and IR counters for counting drops of odorant which pass through the needle valve 37. For example, the drop counter can be a photooptic device in which an LED bundle 43 serves as light source, the light source being received by a pair of photo sensors 45, 47. The drop counter thus measures changing light intensity of a detecting beam which is interrupted by drops of chemical being injecting into the system. The flow-control valve 37 and counting system provide extremely precise flow of odorant into the pipeline.

The particular system illustrated in FIG. 1 utilizes a flow-control valve 37 which is a servo driven needle valve for metering individual drops of odorant. As described in greater detail in Applicant's U.S. Pat. No. 7,056,360, the servo controlled valve is preferably provided with circuitry which utilizes pulse width modulation in order to continually adjust the valves position. A feed back circuit is utilized in order to verify the proper position of the needle valve with respect to its orifice. The needle is used to control the size of the flow orifice in order to obtain the smallest amount of odorant that can be dispensed and also measured as it is injected into the pipeline.

An electronic controller, operative under the control of a program stored therein, is provided to precisely adjust the servo driven needle valve used for metering individual drops of chemical. The controller has inputs connected to a flow meter 49 of the type commonly present in the pipeline. A temperature sensor (not shown) is located in the odorant stream. As will be familiar to those skilled in the art, flow meter 49 generates a signal proportional to the flow of gas within the pipeline 17. The flow meter 49 can provide a digital pulse, or an analog signal, each time a known quantity of gas flows through pipeline 17.

As has been explained in the Background of the Invention, the above described system offers several advantages over the prior art and can be especially advantageously utilized in lower volume flow rate situations. The Z9000.™ unit can also be incorporated into the system of the invention, as will be further described in the discussion which follows.

Figure 2:
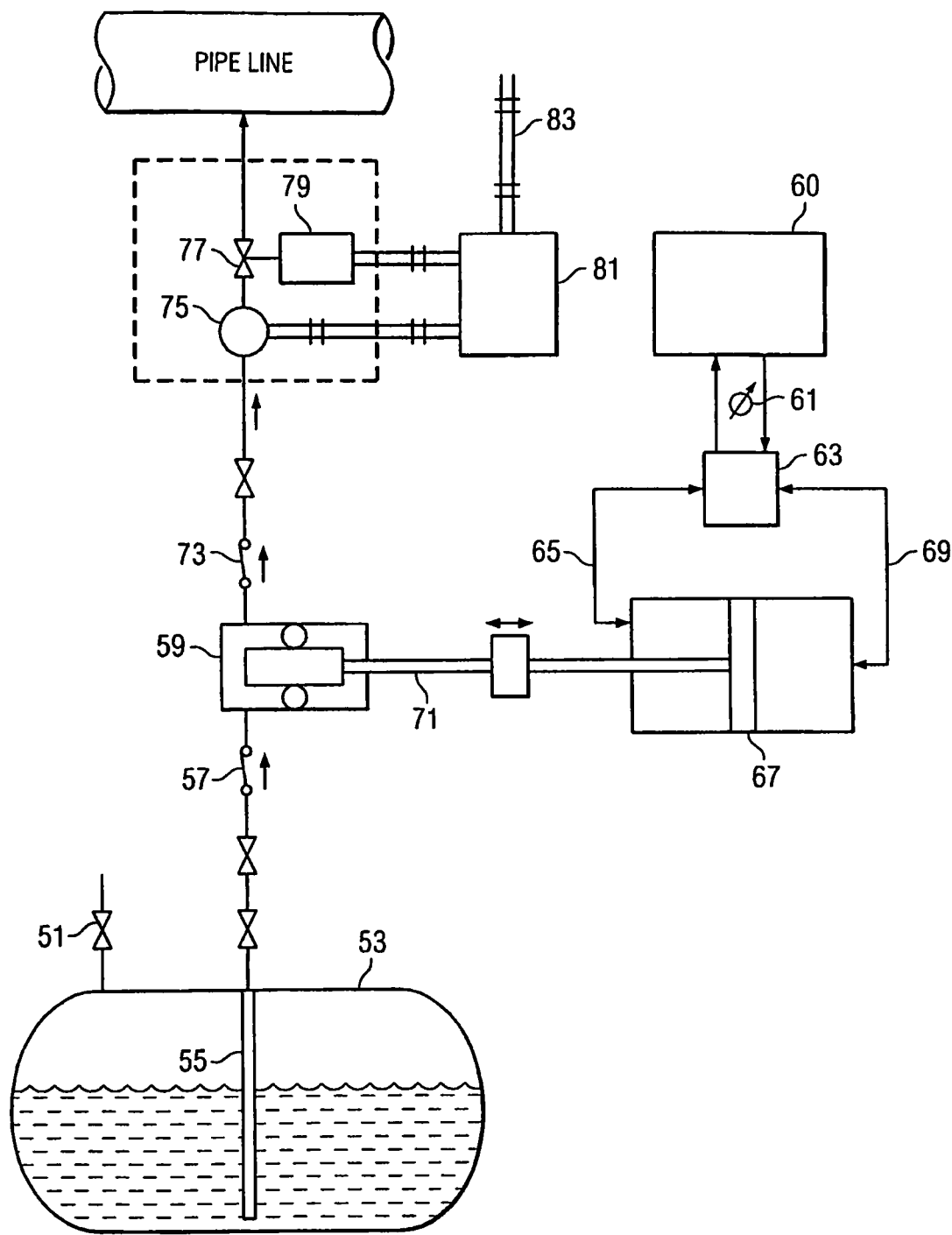
FIG. 2 is also a schematic representation, similar to FIG. 1, of a first version of the constant pressure odorization system of the present invention where a motor driven flow-control valve is located in the injection conduit of the system.

Turning now to FIG. 2, there is shown one version of the constant pressure odorizer system of the invention. A relatively low blanket pressure (e.g., around 35 psig) is applied at connection 51 which is on top of the odorant storage vessel 53. This forces the odorant to flow up through conduit 55, though inlet check valve 57 and into a pressure booster 59. Pressure booster 59 is sized properly to achieve desired results. It can conveniently comprise a standard plunger design, diaphragm or bellows. A hydraulic system 60 generates and maintains desired constant pressure by adjustment of a bypass valve 61. When actuation valve 63 directs the pressure to conduit 65, piston 67 moves to the right. Hydraulic fluid returns to the hydraulic system through conduit 69.

As the piston 67 moves to the right as viewed in FIG. 2, the connection rod 71 enables pressure booster 59 to be charged with liquid odorant. When piston 67 reaches the ends of its travel, actuation valve 63 switches and applies pressure through conduit 69, which allows hydraulic fluid to return through conduit 65. The force transmitted though connecting rod 71 allows the pressure booster 59 to apply pressure to the liquid odorant moving the odorant past discharge check valve 73.

In the version of the system illustrated in FIG. 2, the odorant goes past meter 75 to a flow-control valve 77. Meter 75 can be any style meter depending on anticipated flow rates. One possible option uses differential and static pressure across the flow-control valve and its known flow coefficient at any given setting (which is known precisely by the position feedback of the motor). The position of the flow-control valve 77 is controlled by an electric motor 79. As the flow-control valve is opened, a stream of odorant is injected into the pipeline at a desired flow rate. Flow-control valve 77 is envisioned as comprising a needle valve but other types may be used. This process is controlled by controller 81 which reads meter 75 and pipeline flow rate 83 to control motor 79 which opens flow-control valve 77 to achieve the desired injection rate proportional to flow. Motor 79 as envisioned is a geared servo motor with an optical encoder. Options may include other motor types with position feedback.

A principal advantage of the system illustrated in FIG. 2 of the drawings is that odorant is more accurately blended into the stream. Other systems either slug the system or fail to accurately account for the amount of odorant being injected.

Figure 3:
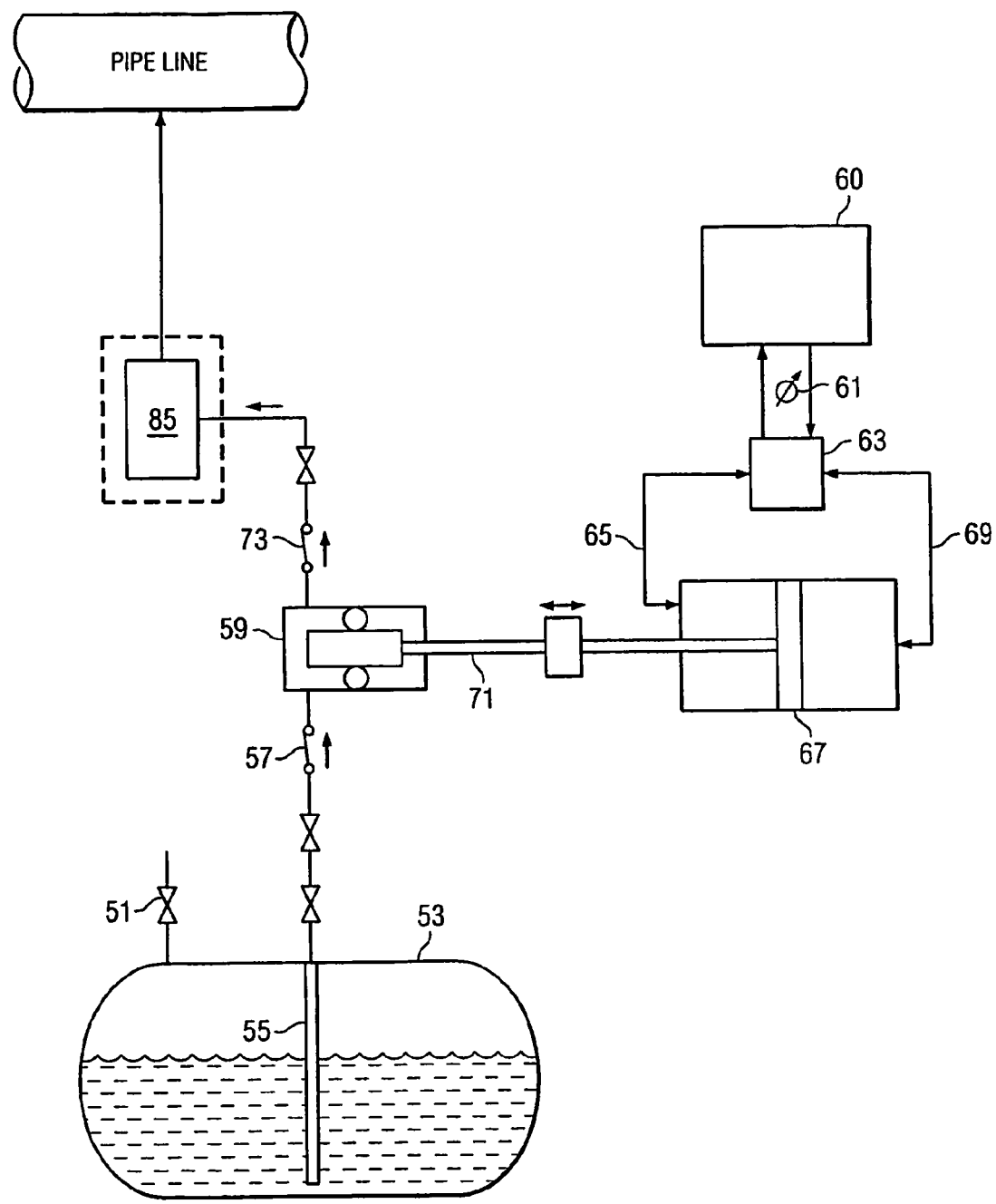
FIG. 3 is a view similar to FIG. 2, but showing another version of the odorization system of the invention in which the flow-control valve is a drip style metering valve.

FIG. 3 is similar to FIG. 2, but illustrates a slightly different system of the invention. In this version of the system of the invention, after the odorant leaves discharge check valve 73, it feeds a drip system 85, such as the Z9000.™ system sold by Zeck Systems, mentioned above and described in U.S. Pat. No. 7,056,360, entitled "Optical Odorization System." The patented system offers many advantages but is limited by the requirement of a storage vessel being required to be pressurized above pipeline pressure. The version of the odorization system shown in FIG. 3 overcomes this limitation. It allows the Z9000.™ unit to be used on high pressure applications without requiring odorant to be stored under high pressures. Although only one Z9000.™ unit is shown in FIG. 3, it will be readily understood that the system shown can feed several such odorizers.

The system of the invention illustrated in FIG. 3 offers a number of advantages over standard displacement type pumps which were often utilized in the prior art systems. Standard displacement pumps can generate pulsing pressure which adversely affects the operation of the drip system. They also require the use of back pressure valves that are exposed to odorant. The isolated hydraulic fluid which is utilized as the prime mover for the pressure booster 59 in the system of FIG. 3 is never exposed to odorant and can be serviced without concern for escape emissions.

Figure 4:
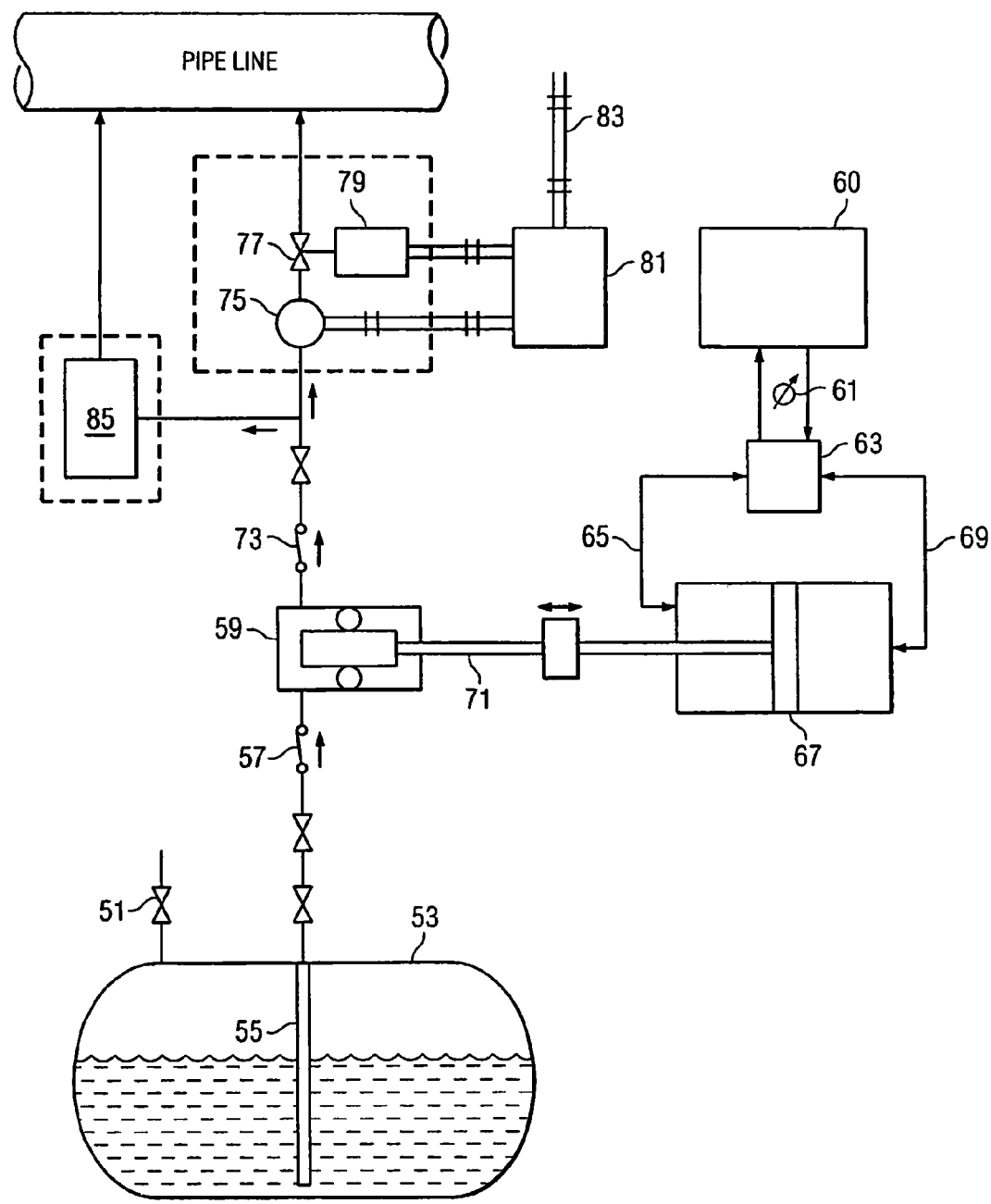
FIG. 4 is a similar schematic illustration of another version of the odorization system of the invention which combines the systems shown in FIGS. 2 and 3.

FIG. 4 shows a still further variation of the systems of the invention which involves the combination of the first two illustrated embodiments. This is useful when and extreme downturn is required. An example would be a gas feed for a gas fired turbine generating electricity. When the station is on, gas can be flowing at high rates. When it is off only fuel gas quantifies are flowing. The combination system shown in FIG. 4 can effectively odorize both extremes.

Figure 5:
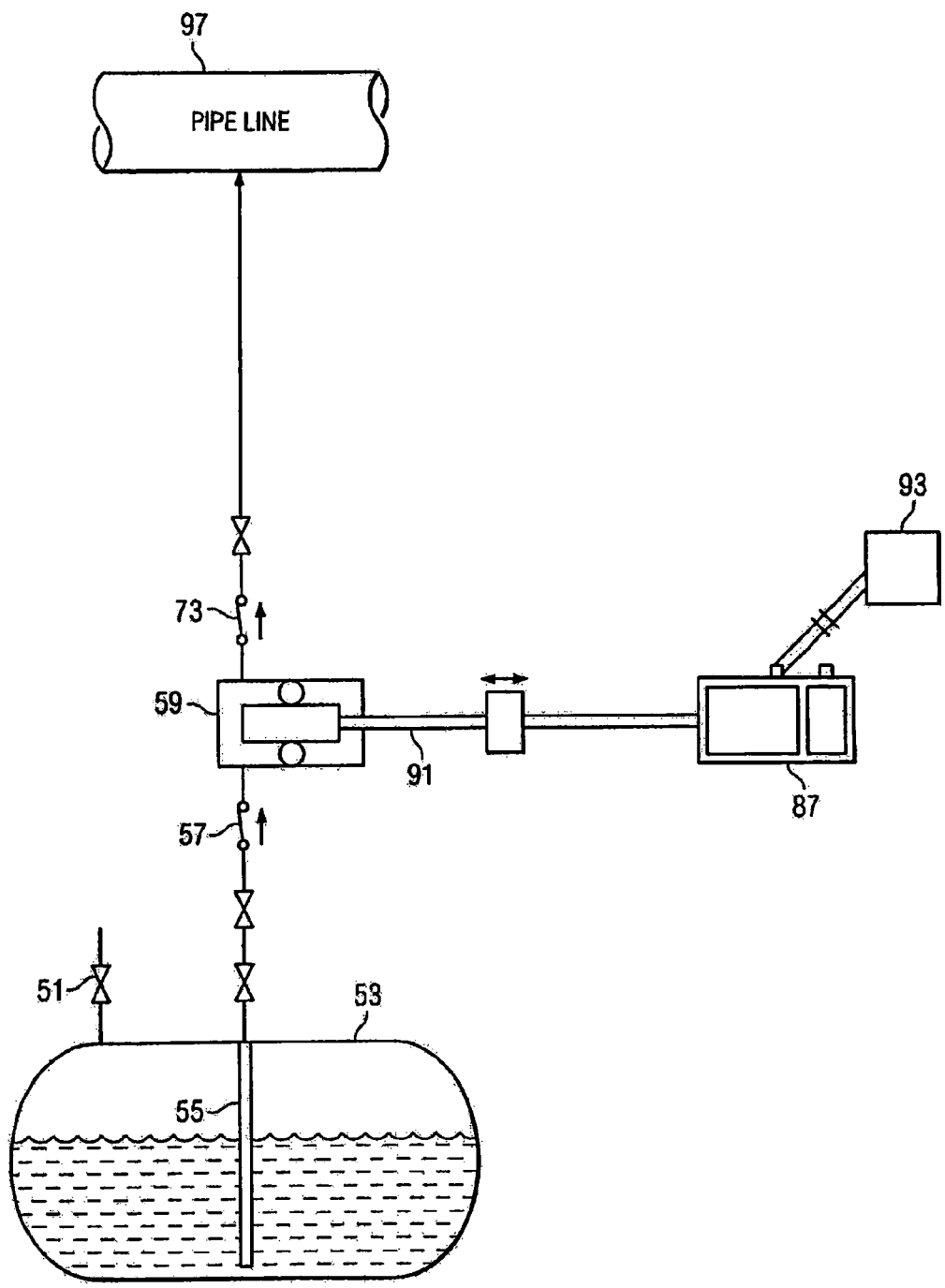
FIG. 5 is a schematic illustration of a modified form of the invention in which an electronic linear actuator is used to generate and maintain the desired constant pressure needed for supplying odorant to the pipeline.

FIG. 5 shows another version of the constant pressure odorization system of the invention. In FIGS. 2-4, a hydraulic piston system was used as a means to boost the pressure of odorant supply. This method offers a number of advantages over the prior art systems in that safety is increased. In FIG. 5, an alternative system is shown in which a partly electronic system is used which offers additional advantages and which is a new approach to odorizing natural gas and LPG. In the system shown in FIG. 5, an electronic linear actuator 87 is used to maintain the desired constant pressure.

In the system shown in FIG. 5, a blanket pressure (again around 35 psig) is applied at connection 51 which is on top of the odorant storage vessel 53. This pressure forces odorant to flow up through conduit 55 through inlet check valve 57 into positive displacement pressure booster unit 59. A commercially available electronic linear actuator 87 generates and maintains desired constant pressure or desired injection rate by delivering and maintaining the desired force or desired motion to the actuation shaft 91. One version of this actuator is available through Exlar Corporation of Chanhassen, Minn., and uses their PRS Series.™ roller screw technology to accomplish this action. This force is communicated to pressure booster 59.

When the shaft of electronic linear actuator 87 moves to the right, connecting rod 91 enables positive displacement unit 59 to be charged with liquid odorant. When actuator 87 reaches the end of its travel, it reverse direction. A preset force or travel is transmitted through connecting rod 91 causing the positive displacement unit 57 to apply pressure to the liquid odorant, thereby moving it past discharge check valve 73.

Thus, in FIG. 5 an electronic linear actuator 87 and positive displacement unit 59 are used to inject odorant into the pipeline, replacing the hydraulic system shown in FIGS. 2-4. An electronic controller 93 controls the linear position of actuator 87. The controller 93 takes into account the pipeline flow rate, desired injection rate and controls the linear movement to achieve desired results. Various sizes of pressure booster 59 can also be used to ensure proper resolution.

Figure 6:
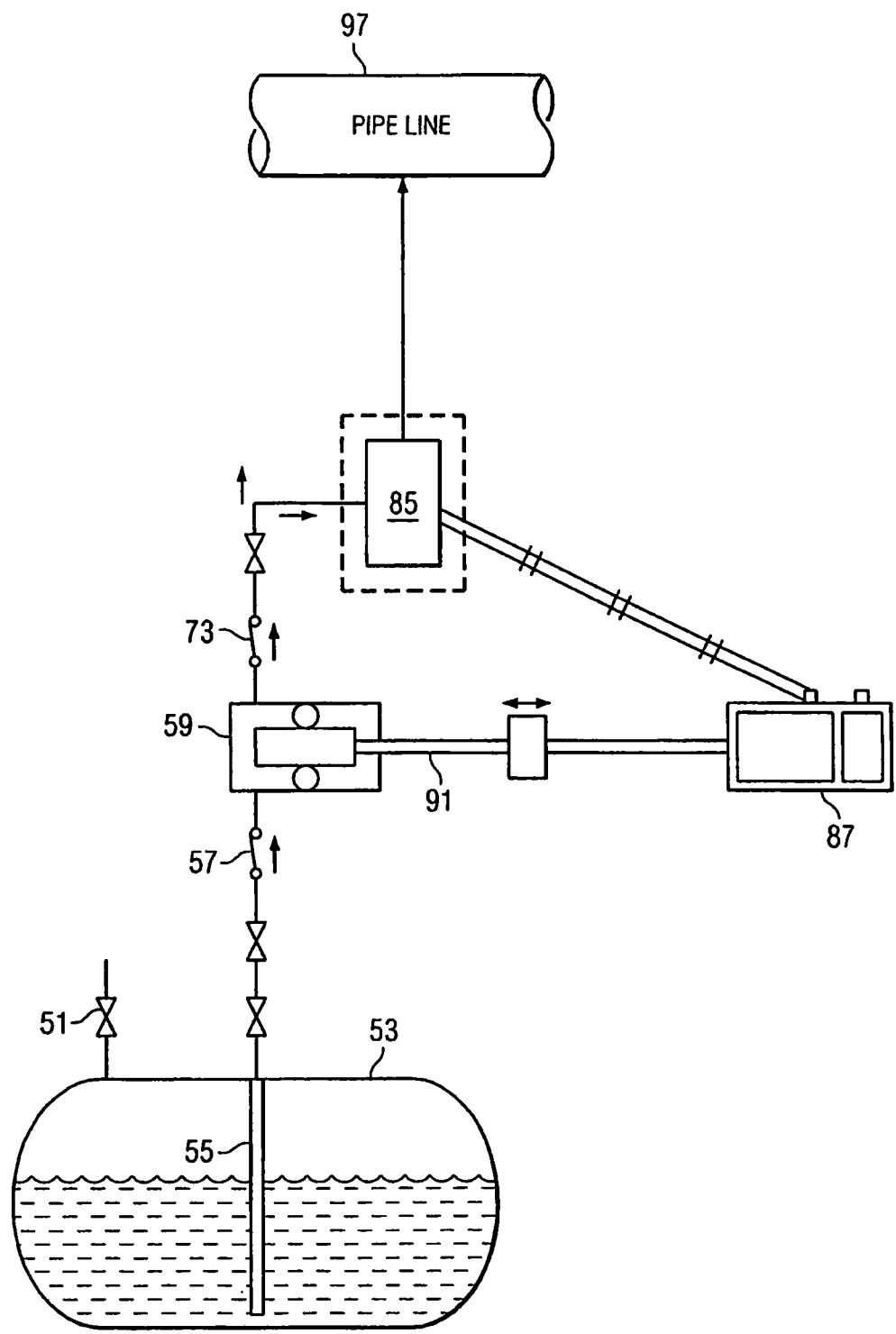
FIG. 6 is a schematic illustration similar to FIG. 5, but with a motor driven flow-control valve present in the injection conduit.

FIG. 6 is similar to FIG. 5 with the exception of the addition of the Z9000.™ unit 85 which acts as both the electronic controller for the linear actuator 87 and which acts to meter odorant into the pipeline 97. The operation of a suitable controller, such as controller 93, is described in greater detail in Applicant's previously referenced U.S. Pat. Nos. 7,056, 360 and 7,389,786, the disclosures of which are hereby incorporated herein by reference. The Z9000.™ unit is used to control linear actuator 87 which acts as a pressure booster. Low pressure odorant is taken from storage tank 53 and boosted to a desired pressure. The Z9000.™ unit 85 communicates the desired pressure to the actuator 87 and a constant load is maintained. The arrangement illustrated in FIG. 6 of the drawings illustrates the use of the metering feature of the actuator 87 and positive displacement unit 59 in combination. The controller knows precisely the linear position of the actuator 87 and the displacement/linear unit of the positive displacement unit 59. The result obtained is precise volume usage information that confirms the Z9000.™ odorant measurement or can be standalone information as in FIG. 5.

Figure 7:
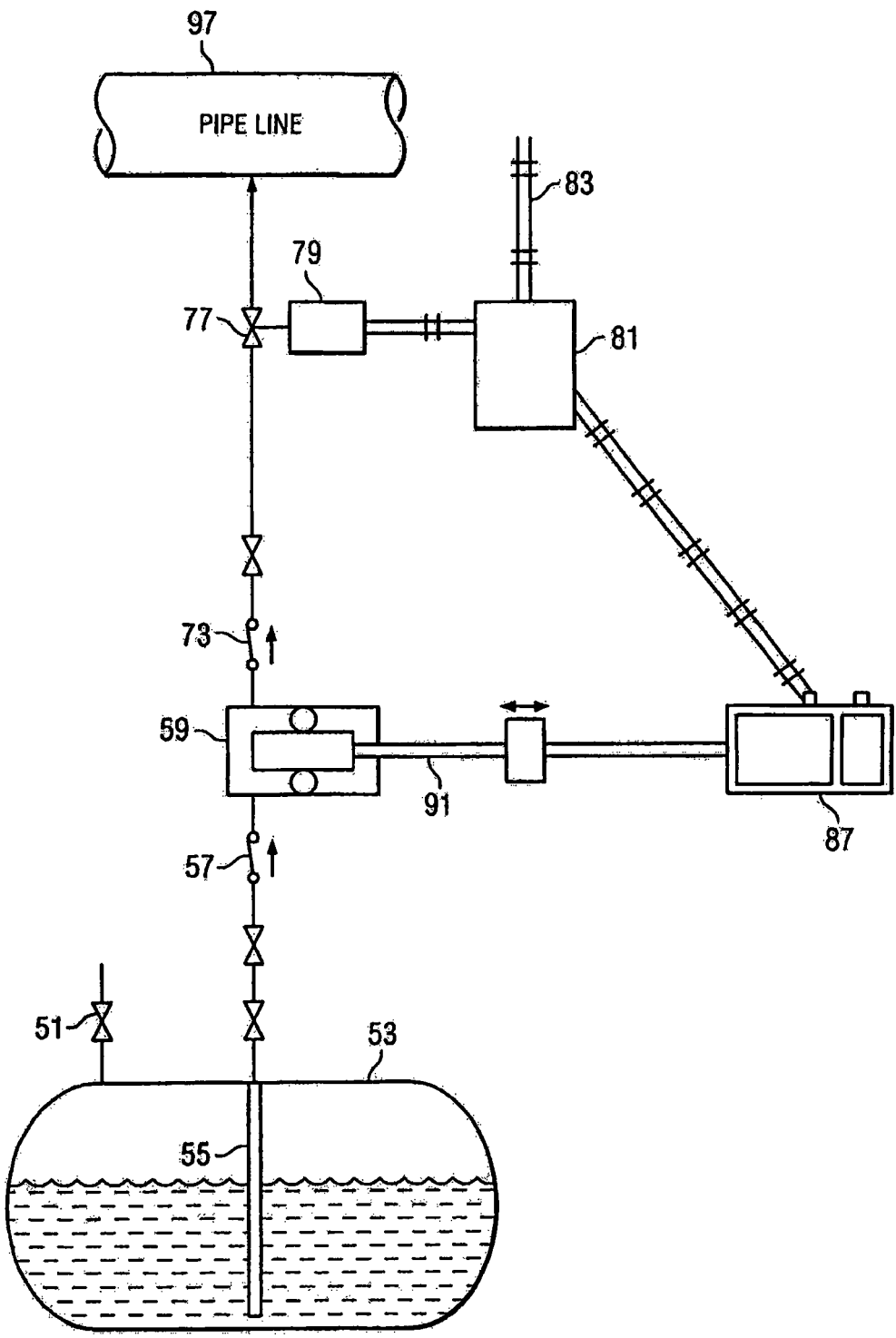
FIG. 7 is a schematic illustration of another version of the system of the invention in which the flow-control valve is a drip style metering valve.

FIG. 7 shows a system that can be used to odorize large volume streams of natural gas or LPG. In the boost mode, this system utilizes a high volume odorizer such as has been described in FIGS. 2-4 of the drawings. Because of the measurement benefit of this arrangement of the invention, the meter 75 described in FIGS. 2-4 is not required. The arrangement of components illustrated in FIG. 7 thus constitutes an improvement to that system. In FIG. 7, metering valve 77 controls the injection of odorant into the pipeline. This valve is controlled by motor 79 and an electronic controller 81.

Figure 8:
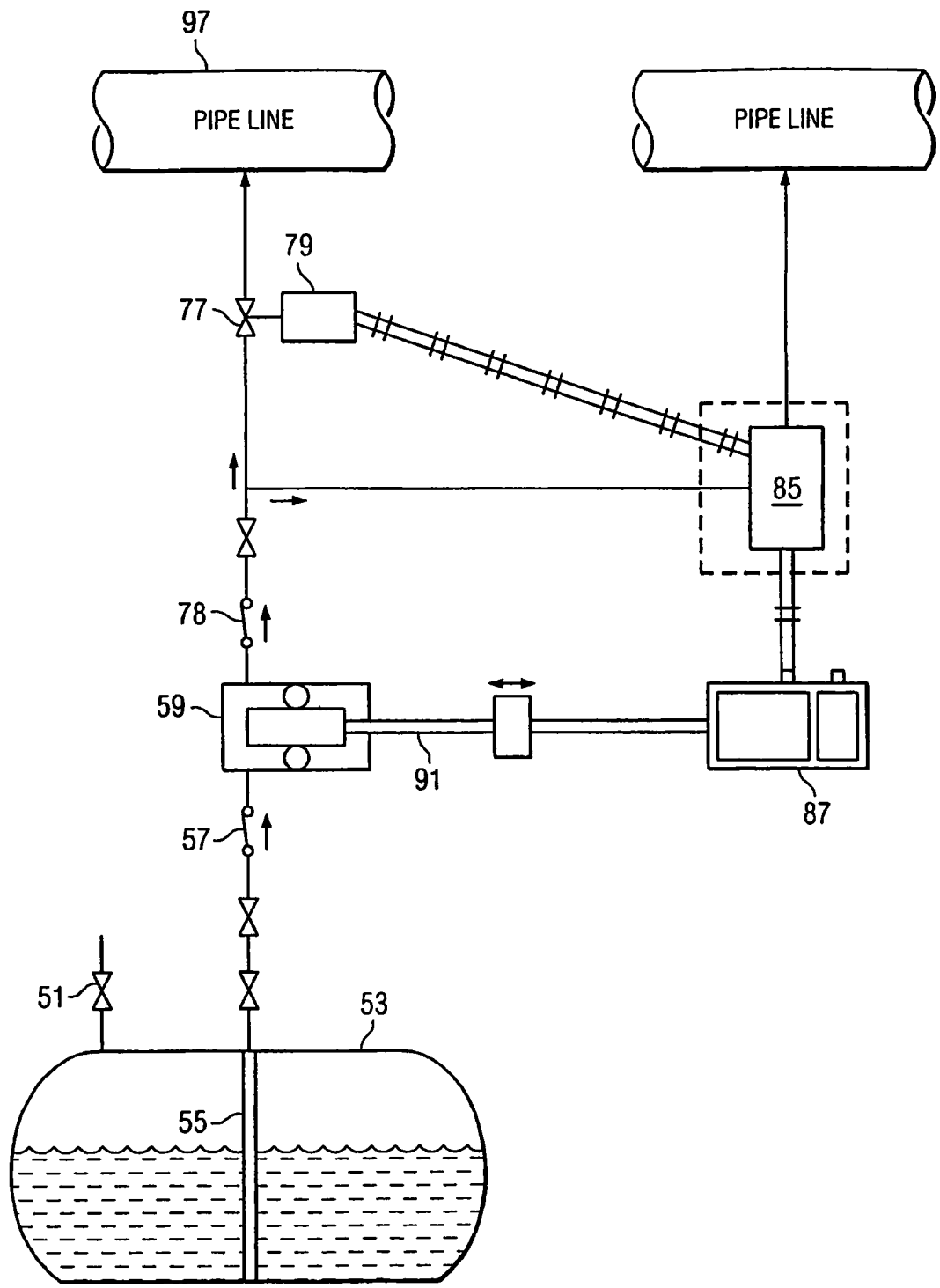
FIG. 8 is a schematic illustration of another version of the odorization system of the invention which combines the systems of FIGS. 6 and 7.

FIG. 8 of the drawings represents a combination of the features described with respect to FIGS. 6 and 7 discussed above.

Figure 9:
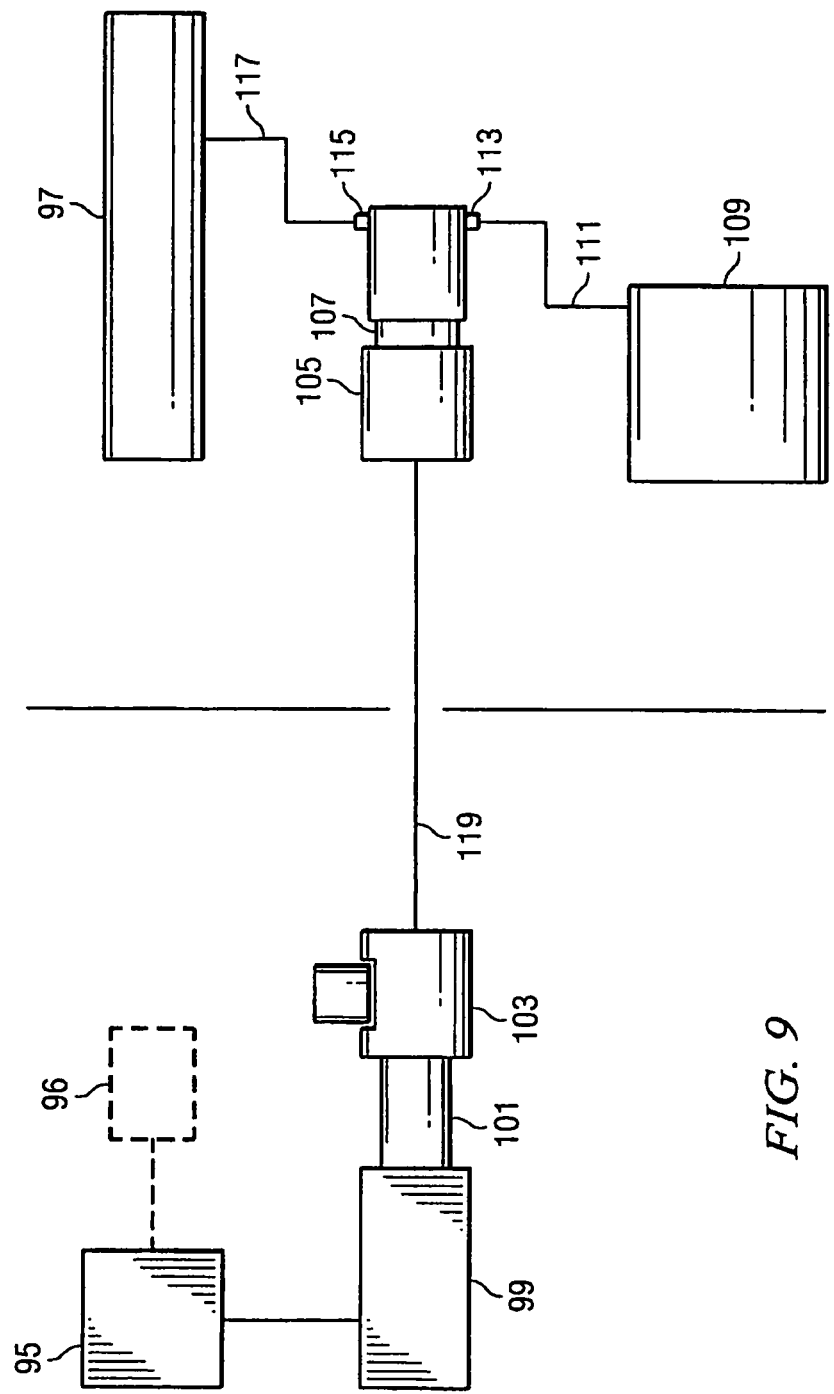
FIG. 9 is a schematic illustration of a particularly preferred arrangement of components for carrying out the desired objectives of the invention.

FIG. 9 represents a further evolution of the odorant injection system of the invention and shows a particularly preferred arrangement of the component parts. An electronic controller 95 receives flow logic from a customer's meter that indicates how much gas is flowing down pipeline 97. The particular controller illustrated schematically in FIG. 9 is a Model XSL-230-18.™, commercially available from Copley Controls Corp., of Canton, Mass. However, the controller could also be any of a number of other commercially available controllers, such as the Bristol Control Wave Micro.™ available from Emerson Process Management, or similar RTU. The controller 95 then controls and monitors linear thruster 99 to deliver and verify delivery of the desired amount of odorant per unit volume of gas.

Linear thruster 99 can control the position of rod 101 as desired. It can measure and control the force involved to do the work. In the preferred system illustrated in FIG. 9, the linear thruster 99 is a model STA-25105-078-SO3X.™, also manufactured by Copely Controls. Master Cylinder 103 works in the same manner as that of an automobile's master cylinder. It transmits force to the hydraulic side of the odorant pump 105. That force moves diaphragm 107 which separates the odorant and hydraulic fluid. Odorant stored in the vessel 109 under pressure travels up conduit 111 to inlet 113 to the odorant side of the pump 105. When the hydraulic pressure from the master cylinder is applied, the odorant overcomes pipeline pressure and injects odorant through discharge check valve 115 through conduit 117 into pipeline 97. Spring pressure and reversed direction of rod 101 returns hydraulic fluid and fills the odorant pump with odorant. As has been mentioned, an optional pressure transmitter can be incorporated into the system, for example as an adjunct to the primary controller 95 (illustrated schematically as 96 in FIG. 9). In this slightly modified version of the system, in addition to monitoring the forces of the linear thruster 99, the pressure transmitter 96 monitors the hydraulic and/or odorant pressures of the system. The collected information is then fed directly to the primary controller 95 to verify and/or augment the data from the linear thruster.

The pressure transmitter 96 can be used, for example, to read the output side of the odorant pump 105. A suitable pressure transmitter unit can be obtained commercially, such as the Rosemont 4600.™ Oil and Gas Panel Pressure Transmitter, available from Emerson Process Management, Rosemont, Inc. Chanhassen, Minn.

As will be appreciated from FIG. 9, the pump 105 constitutes a type of "diaphragm pump" as opposed to a traditional positive displacement pump used in odorization systems of the prior art. By "diaphragm pump" is meant the traditional definition of a pump that uses the combination of the reciprocating action of rubber thermoplastic or Teflon.™ type diaphragm element and suitable non-return check valves to pump a fluid, sometimes referred to in the relevant art as a "membrane" style pump. The diaphragm element is sealed with one side in the fluid to be pumped, and the other in [air or] hydraulic fluid. The diaphragm is flexed, causing the volume of the pump chamber to increase and decrease. A pair of non-return check valves prevent reverse flow of the fluid.

The system of the invention illustrated in FIG. 9 offers a number of advantages over the prior art systems. Gas flow rates can vary dramatically. This system has the ability to deliver small to large volumes/stroke by precisely controlling the displacement rod and measuring the force. This force tells the unit that it was overpowering pipeline pressure during a measured amount of travel—making a separate meter unnecessary. Large times between injections are avoided. The electrical and electronic parts are separated from the odorant parts by a hydraulic line (119 in FIG. 9). As a result, no electronic components are located in a hazardous area of the system.

An invention has been provided with several advantages. The odorization system of the invention is extremely simple as compared to existing positive displacement pump systems. The system offers improved ease of understanding, operation and maintenance. As compared to the prior art systems, the present system offers more accurate control, verification and communication than the prior art systems. Compared to the prior art systems, the system of the invention offers a smell free operation and maintenance. No gas is exhausted to the atmosphere.

While the invention has been shown in several of its forms, it is not thus limited but is susceptible to various changes and modifications without departing from the spirit thereof.

The invention claimed is:

1. In a method for odorizing natural gas or liquefied petroleum gas flowing through a pipeline by injecting an odorant from an odorant storage tank through an injection conduit into the pipeline at a desired rate controlled by flow-control apparatus in the injection conduit, the improvement comprising the steps of:
   communicating a pressurized source of inert gas with the odorant storage tank for maintaining the tank at a desired positive pressure above ambient but below the pressure of the pipeline;
   locating a hydraulic pressure booster in the injection conduit for pressurizing the odorant in the injection conduit to a pressure above that of the pipeline, the hydraulic pressure booster communicating with the odorant being injected and having a hydraulic-pressure side which is isolated from the odorant being injected;
   repeatedly supplying hydraulic fluid to the hydraulic-pressure side to thereby cause odorant to flow through the injection conduit and the flow-control apparatus into the pipeline, the flow-control apparatus including a motor-controlled flow valve which allows larger volumes of chemical to be injected into the pipeline and a drop-wise flow valve for metering smaller volumes of chemical being injected, the supply of hydraulic fluid being affected by the action of an electronic linear actuator in response to commands from an electronic controller.

2. The method of claim 1 wherein the hydraulic pressure booster is a diaphragm pump.

3. The method of claim 1 wherein the position of the motor-controlled flow valve is controlled by an electric motor, whereby opening of the valve causes a stream of chemical to be injected into the pipeline at a desired flow rate.

4. The method of claim 1 wherein the electronic controller controls the position of a linear thrust rod in the linear actuator to thereby transmit hydraulic force to the isolated side of the diaphragm.

5. The method of claim 4 wherein, in addition to controlling the position of the linear thrust rod in the linear actuator to thereby transmit force to the second side of the diaphragm, a pressure transmitter unit is provided for monitoring (a) the hydraulic fluid and/or (b) the odorant pressure in the injection conduit.

6. The method of claim 1 further including metering odorant flow in the injection conduit and providing feed-back to the electronic controller.

7. In a method for odorizing natural gas or liquefied petroleum gas flowing through a pipeline by injecting an odorant from an odorant storage tank through an injection conduit into the pipeline at a desired rate controlled by a flow-control valve in the injection conduit, the improvement comprising the steps of:

communicating a pressurized source of inert gas with the odorant storage tank for maintaining the tank at a desired positive pressure above ambient but below the pressure of the pipeline;

locating a hydraulic pressure booster in the injection conduit for pressurizing the odorant in the injection conduit to a pressure above that of the pipeline, the hydraulic pressure booster communicating with the odorant being injected and having a hydraulic-pressure side which is isolated from the odorant being injected;

repeatedly supplying hydraulic fluid to the hydraulic-pressure side to thereby cause odorant to flow through the injection conduit and the flow-control valve into the pipeline, the flow-control valve being a drip-style metering valve which is adjustable between a drop-wise setting for metering chemical into the pipeline on a drop-by-drop basis and a steady flow setting for metering chemical on a steady-state flow basis apparatus.

8. The method of claim 7 wherein the hydraulic pressure booster is a diaphragm pump.

9. The method of claim 7 wherein the electronic controller controls the position of a linear thrust rod in the linear actuator to thereby transmit hydraulic force to the isolated side of the diaphragm.

10. The method of claim 9 wherein, in addition to controlling the position of the linear thrust rod in the linear actuator to thereby transmit force to the second side of the diaphragm, a pressure transmitter unit is provided for monitoring (a) the hydraulic fluid and/or (b) the odorant pressure in the injection conduit.

11. The method of claim 7 further including metering odorant flow in the injection conduit and providing feed-back to the electronic controller.

* * * * *

UNITED STATES PATENT AND TRADEMARK OFFICE
CERTIFICATE OF CORRECTION

PATENT NO. : 8,475,550 B2
APPLICATION NO. : 13/418977
DATED : July 2, 2013
INVENTOR(S) : Mark Zeck Page 1 of 1

It is certified that error appears in the above-identified patent and that said Letters Patent is hereby corrected as shown below:

In the Specification

In column 2, line 64, delete the word "vale" and insert -- valve --.
In column 5, line 25, delete "theses" and insert -- these --.
In column 7, line 6, delete the word "though" and insert -- through --.
In column 7, line 19, delete the word "though" and insert -- through --.
In column 8, line 6, delete the word "and" and insert -- an --.
In column 8, line 10, delete the word "quantifies" and insert -- quantities --.
In column 8, line 38, delete the word "reverse" and insert -- reverses --.
In column 10, lines 3-4, delete "[air or]" and insert -- air or --.

Signed and Sealed this
Seventh Day of April, 2015

Michelle K. Lee
*Director of the United States Patent and Trademark Office*